United States Patent
Takizawa

(10) Patent No.: US 6,246,255 B1
(45) Date of Patent: Jun. 12, 2001

(54) INTEGRATED CIRCUIT FOR ACTIVE TERMINATOR

(75) Inventor: Noboru Takizawa, Kyoto (JP)

(73) Assignee: Rohm Co., Ltd. (JP)

( * ) Notice: Subject to any disclaimer, the term of this patent is extended or adjusted under 35 U.S.C. 154(b) by 0 days.

(21) Appl. No.: 09/232,046

(22) Filed: Jan. 15, 1999

Related U.S. Application Data

(63) Continuation-in-part of application No. 09/645,978, filed on Nov. 6, 1998, now abandoned.

(30) Foreign Application Priority Data

Mar. 25, 1997 (JP) .................................................. 9-090090

(51) Int. Cl.[7] .......................... H03K 19/003; H03K 17/16
(52) U.S. Cl. .................................. 326/30; 326/10; 326/82
(58) Field of Search ................................... 326/30, 82, 9, 326/10

(56) References Cited

U.S. PATENT DOCUMENTS

| | | | |
|---|---|---|---|
| 5,107,230 | * 4/1992 | King | 326/86 |
| 5,382,841 | * 1/1995 | Feldbaumer | 326/30 |
| 5,506,499 | * 4/1996 | Puar | 324/158.1 |
| 5,553,250 | * 9/1996 | Miyagawa et al. | 326/30 |
| 5,635,852 | * 6/1997 | Wallace | 326/30 |

OTHER PUBLICATIONS

3–Mode Small Computer System Interface Terminator, IBM Technical Disclosure Bulleting, vol. 37 No. 11, pp. 315–316, Nov. 1994.*

* cited by examiner

Primary Examiner—Michael Tokar
Assistant Examiner—Daniel D. Chang
(74) Attorney, Agent, or Firm—Coudert Brothers

(57) ABSTRACT

An IC for an active terminator has not only a plurality of pairs each corresponding to a different line of a bus and including a terminal resistor and a buffer amplifier which serves to output a specified voltage through the corresponding terminal resistor to the corresponding bus line, but also a similar pair of an additional buffer amplifier and an additional resistor. One end of the additional resistor is connected to the additional buffer amplifier and the other end of the additional resistor is connected to a pair of pads. Each of these terminal resistors may be connected to adjustment resistors each connected to its own additional buffer amplifier serving to output a specified voltage through the corresponding adjustment resistor to the corresponding line. These additional buffer amplifiers are controlled by a control signal received through their individual control lines which are grouped, the lines in each group being connected together into a common line which contains a repair part where it can be cut.

6 Claims, 5 Drawing Sheets

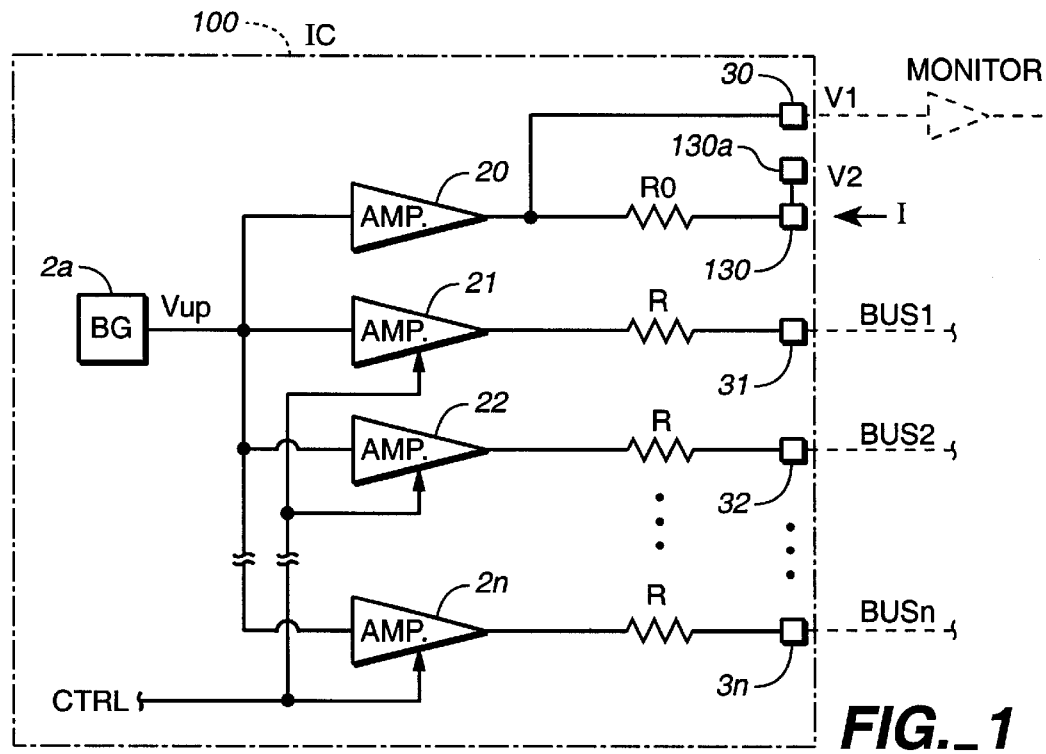
FIG._1
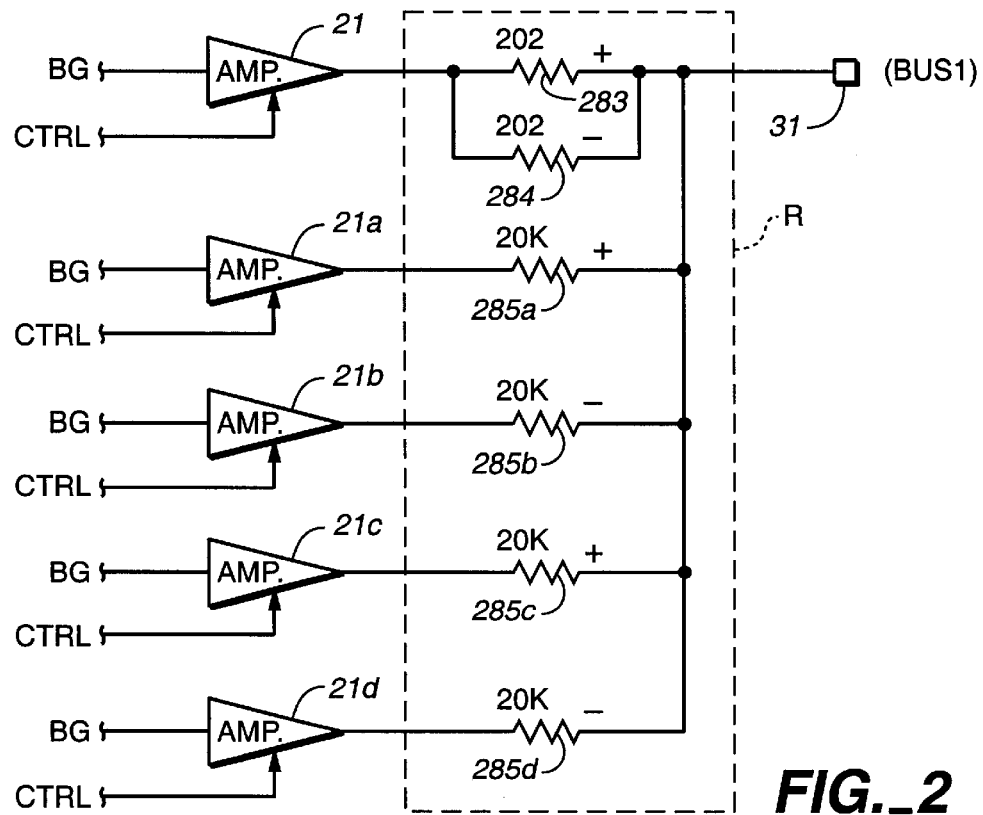
FIG._2

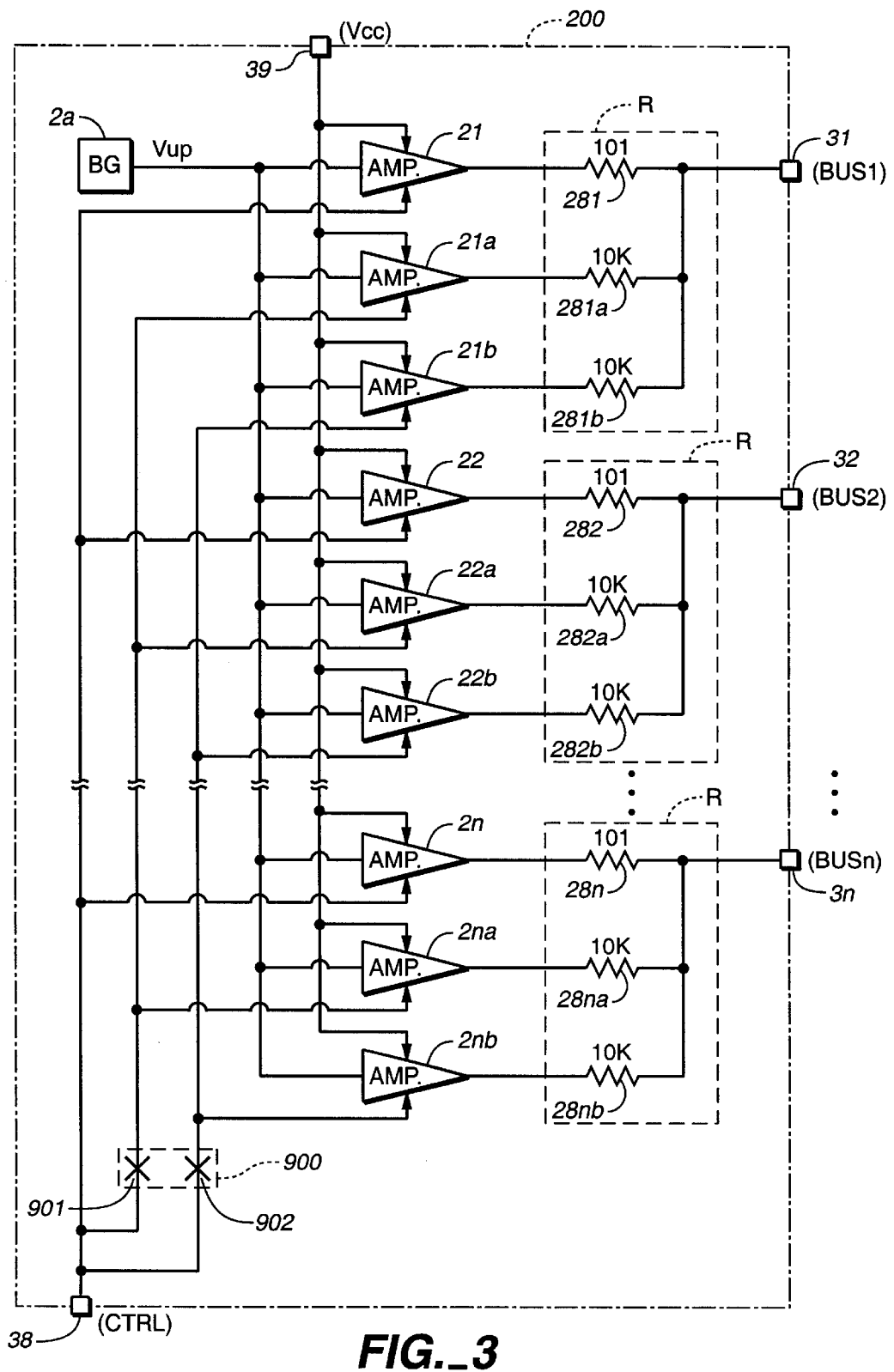
FIG._3

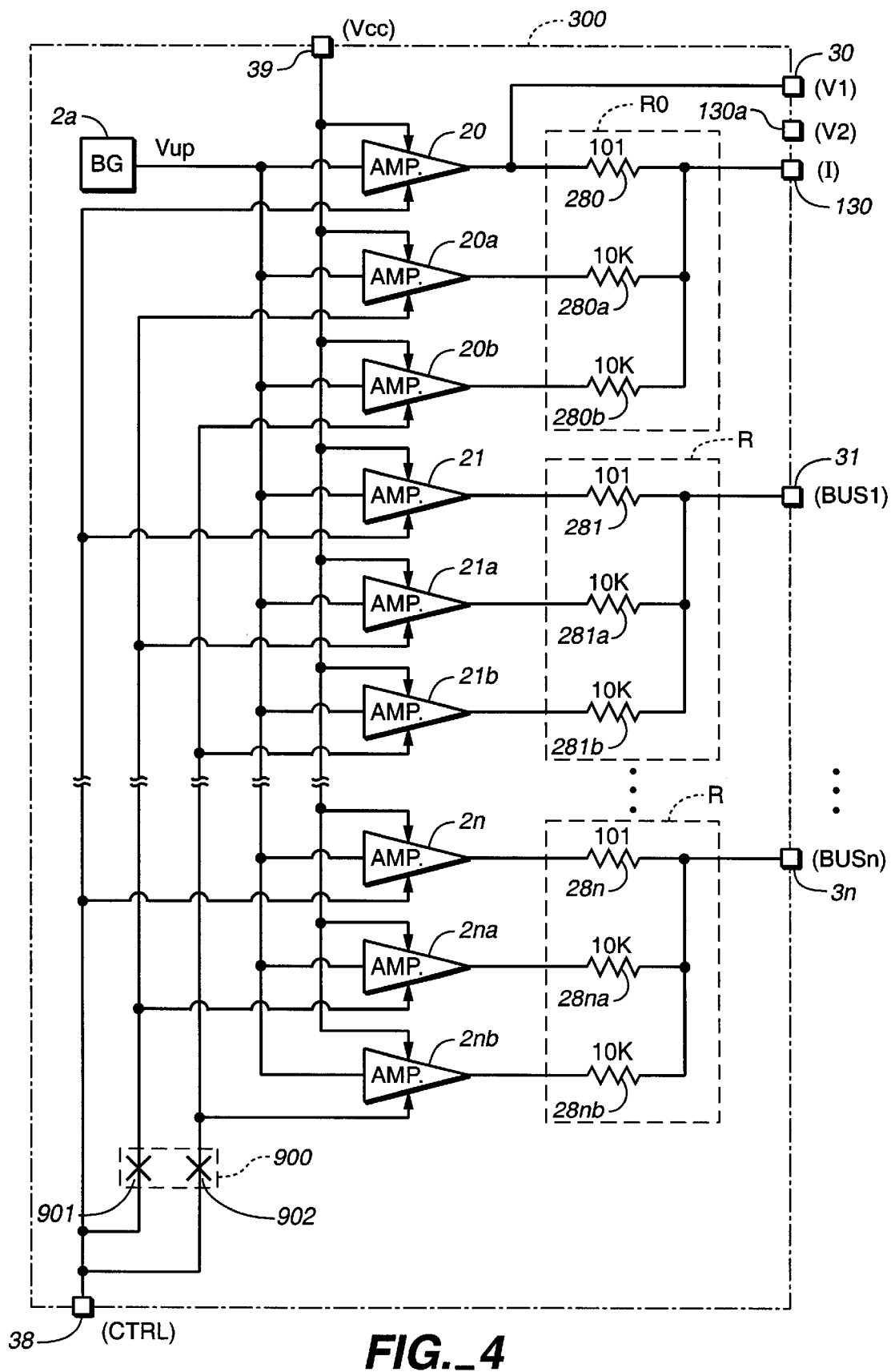
FIG._4

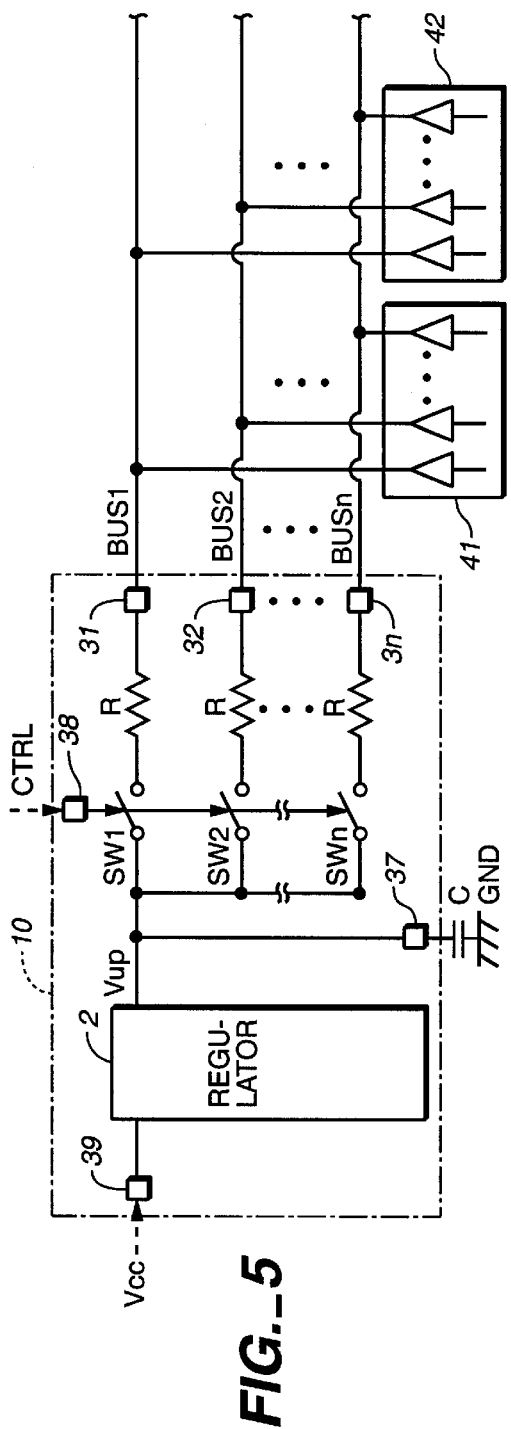
FIG._5
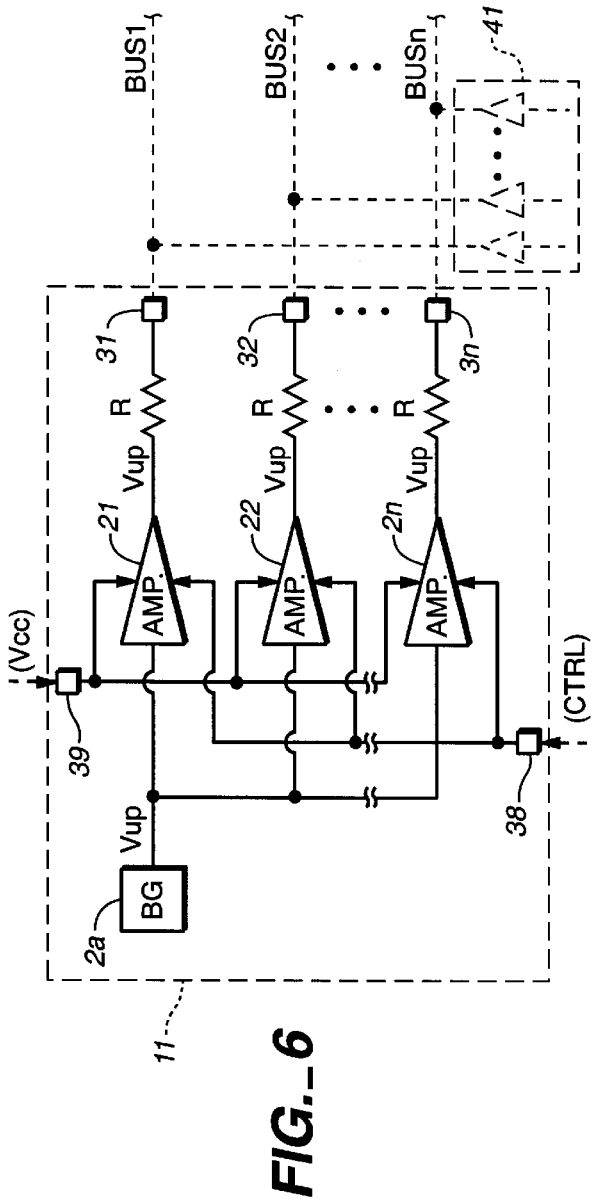
FIG._6

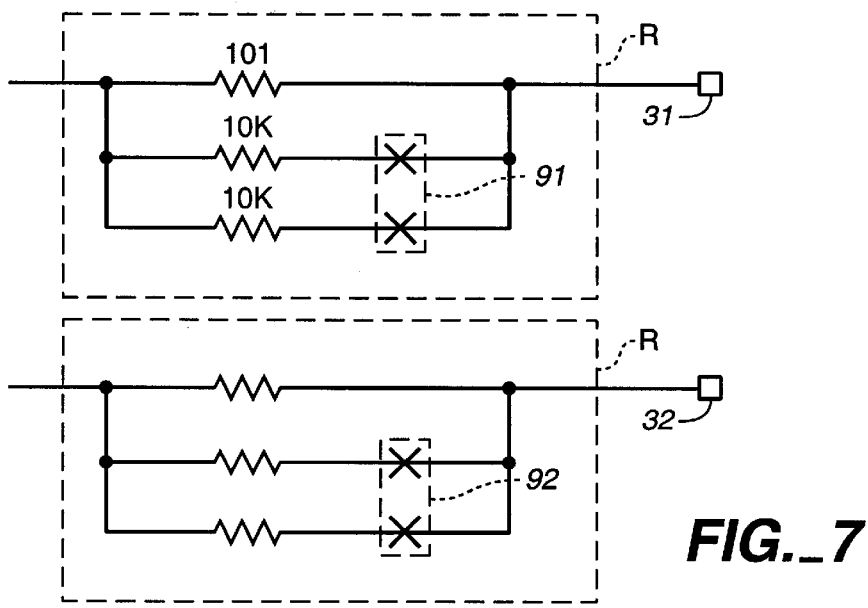
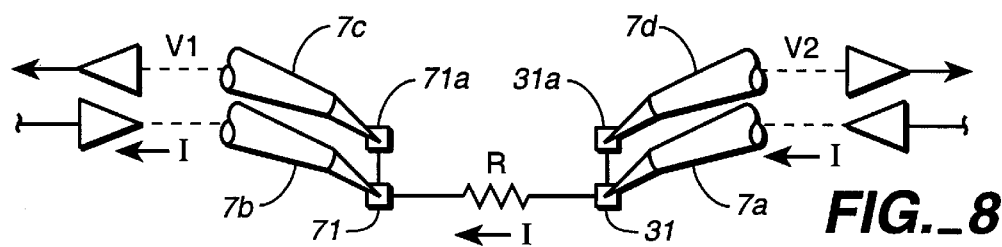
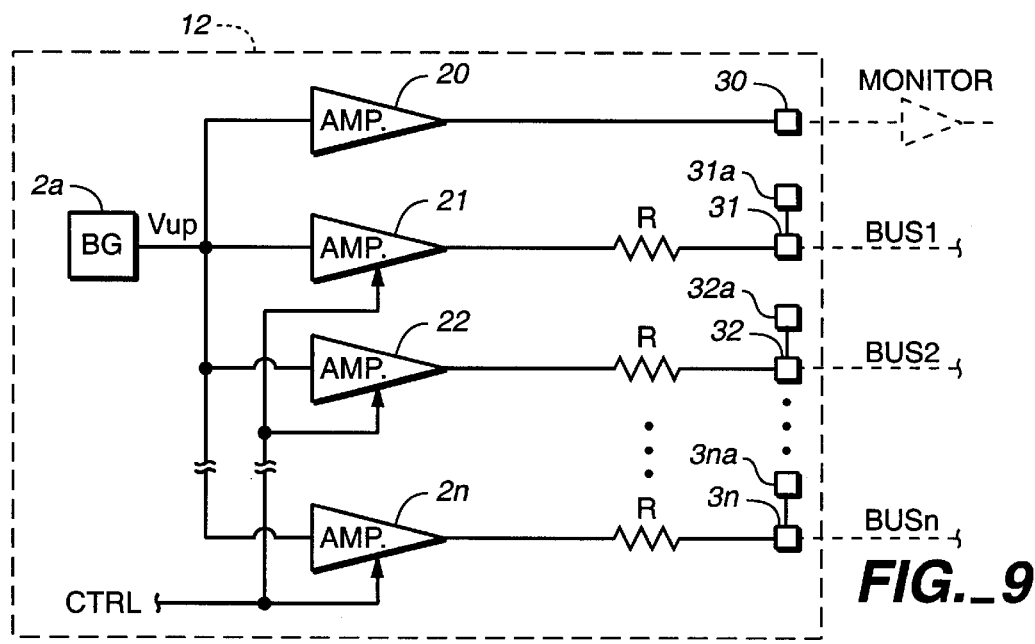
FIG._7
FIG._8
FIG._9

INTEGRATED CIRCUIT FOR ACTIVE TERMINATOR

This is a continuation-in-part of application Ser. No. 08/998,414 filed Dec. 24, 1997, now abondoned.

BACKGROUND OF THE INVENTION

This invention relates to an integrated circuit (IC) for an active terminator adapted to be connected at an end of a bus line such as SCSI to make its high-speed operations possible and more particularly to such an IC capable of improving accuracy in the terminal resistance and reducing parasitic capacitance related to a probe test on the resistance value.

In the case of a bus adapted to transmit signals among a plurality of drive units, terminal resistors are connected individually to its lines, say, for preventing the "ringing." The resistance value of each terminal resistor is matched to the characteristic impedance of the line and a specified voltage is outputted to each line through its terminal resistor for making a high-speed operation possible. In order to avoid interference with another active terminator, such outputs of specified voltages may be carried out selectively in response to a control signal.

FIG. 5 shows a basic active terminator, considered and attempted earlier but not published by the assignee hereof (prior to the priority date herefor), formed as an integrated circuit 10, integrating such a circuit on a single chip, serving as a compact system allowing a plurality of drive units 41, 42, . . . to be connected through a bus. Thus, this active terminator IC is provided with a regulator 2 for receiving a source voltage $V_{cc}$ through a bonding pad 39 for external connection and generating a specified pull-up voltage $V_{up}$, a capacitor C attached externally through another bonding pad 37 for smoothing the pull-up voltage $V_{up}$ and terminal resistors R and their bonding pads 31–3n each corresponding to one of a plural n-number of bus lines BUS1–BUSn. One end of each of the resistors R (corresponding to bus line BUSi where I is a dummy index 1–n) is connected to the corresponding one of the bonding pads 3i and the other end is connected through a switch SWi to the output terminal of the regulator 2. As each of the switches SWi is opened and closed in response to a control signal CTRL received from outside through a pad 38, the pull-up voltage $V_{up}$ may be outputted selectively to the bus line or may be put in a floating condition, depending on the situation.

FIG. 6 shows another active terminator IC 11, considered and attempted earlier but not yet published by the assignee hereof, for driving an amplifier having a plurality of pairs of a buffer amplifier and a terminal resistor corresponding to individual lines of a bus and being adapted to output a specified voltage to each line through the corresponding terminal resistor by the corresponding buffer amplifier. The capacitor C of FIG. 5 is not required in this case and, in order to improve the high-speed capability and isolation characteristics, the combination of regulator and switches in the case of FIG. 5 is replaced by a band-gap voltage source 2a for generating the pull-up voltage $V_{up}$ serving as a reference voltage. There are also provided n-number of buffer amplifiers 21–2n adapted to receive the output from the band-gap voltage source 2a and to current-amplify it. These buffer amplifiers (2i where I is again a dummy index 1–n) are connected such that the output of the amplifier 2i is transmitted through the corresponding terminal resistor R to the bonding pad 3i. As described in Japanese Patent Publications Tokkai 7-261890 and 7-240642, these buffer amplifiers 2i are also adapted to each receive a control signal CTRL through a bonding pad 39 such that the output condition can be selectably switched among a specified voltage, a floating condition and something else.

In order to keep the resistance value of each terminal resistor R within a specified range, each terminal resistor R is provided with an adjustment resistor such that the resistance value can be changed by switching on or off the connection. If the ideal resistance value is 100Ω but the resistance values of the terminal resistors R fluctuate between 99Ω and 101Ω, for example, two adjustment resistors of 10 KΩ may be connected in parallel to a base resistor of 101Ω and a repair part 91 (or 92) which can be cut by a laser is inserted in the line of these adjustment resistors as shown in FIG. 7. If the resistance value of the terminal resistor R is 98Ω when measured after the end of preliminary processes at the time of production of the IC, both adjustment resistors are disconnected to make the resistance value equal to 100Ω. If it is 99Ω, only one of them is disconnected and if it is 100Ω, both adjustment resistors are left connected. Such process is carried out for each of the terminal resistors R.

When the internal resistance value of the IC is measured prior to the adjustment of the resistance values of the terminal resistors R, a probe test is carried out prior to the dicing process. In order to prevent the occurrence of measurement errors caused by variations in the contact resistance between the probe and the pad at the time of the probe test, it is necessary to provide voltage-detection pads in addition to current-forcing pads. For measuring the resistance value of a terminal resistor R with one end connected to a bonding pad 31, for example, this may be done as shown in FIG. 8 by providing a dummy pad 31a also connected to the end of the terminal resistor R like the bonding pad 31. Pads 71 and 71a are provided at the opposite end of the terminal resistor R such that, when the probe test is carried out, a constant current I is forced to pass from a probe pin 7a sequentially through the bonding pad 31, the terminal resistor R and the pad 71 to the other probe pin 7b and the voltage V1 at the pad 71a is detected by the probe pin 7c while the voltage V2 at the dummy pad 31a is detected by the probe pin 7d. The resistance value of the terminal resistor R is then obtained as (V2−V1)/I without being influenced by the contact resistance.

FIG. 9 shows still another active terminator IC 12, considered and attempted earlier but not yet published by the assignee hereof, having each of its bonding pads 31–3n provided with a dummy pad 31a–3na such that such a probe test can be carried out. Thus, the resistance value of the terminal resistor R corresponding, say, to the bus line BUS1 can be measured by using the bonding pad 31 as the pad for forcing the current I and the dummy pad 31a for the detection of voltage V2. The active terminator IC 12 of FIG. 9 is also provided with an extra bonding pad 30 not corresponding to any of the bus lines BUS1–BUSn and a voltage monitoring buffer amplifier 20 structured approximately identically to the buffer amplifiers 21–2n such that the pull-up voltage $V_{up}$ from the band-gap voltage source 2a can be monitored from outside through the buffer amplifier 20 and the bonding pad 30.

With such earlier considered active terminator ICs, a voltage-detecting dummy pad must thus be preliminarily set for each of the current-forcing bonding pads for measuring the resistance value of the terminal resistor. This causes the chip area to become large and since the parasitic capacitance increases, the speed of operating the bus is adversely affected. It is troublesome to measure the resistance value of each of many terminal resistors corresponding to the large number of lines in a bus and to make repairs on each, and it adversely affects the production cost.

In view of the above, it has been a common practice to put terminal resistors into use without carrying out measurements of resistance values or adjustments as long as it was allowed by the required degree of precision or the normal bus line specifications. If the level required by the specification was too severe, products with a large parasitic capacitance were put in use in spite of the expense, instead of carrying out measurements and adjustments on the terminal resistors.

With the increasing operating speed of multi-purpose CPUs, however, there is an increasing demand to increase the speed of bus lines and particularly device buses such as SCSI connecting to peripheral apparatus. In order to respond to such a demand, it is necessary to keep the resistance value of the terminal resistors even by sorting ICs and adjusting resistance values by measuring the resistance values of terminal resistors internally contained in the IC, reducing the parasitic capacitance and improving the high-speed characteristics of the bus operations. Since the limitations on the cost are also severe, the number of process steps, when the terminal resistors are measured and/or adjusted, must be reduced as stringently as possible.

SUMMARY OF THE INVENTION

It is therefore an object of this invention to provide an active terminator IC with which the terminal resistance values can be easily measured and adjusted and the parasitic capacitance is small.

Five approaches for attaining the above and other objects will be discussed next.

An IC for an active terminator according to a first of the aforementioned five approaches of the invention may be characterized not only as relating to the type of active terminator IC having a plurality of pairs each corresponding to a different line of a bus and including a buffer amplifier and a terminal resistor, each of the buffer amplifiers serving to output a specified voltage through the corresponding terminal resistor to the corresponding bus line, but also as additionally comprising a similar pair of an additional buffer amplifier and an additional resistor, one end of the additional resistor being connected to the additional buffer amplifier and the other end of the additional resistor being connected to a pair of pads. In the above, "the similar pair" may be ideally identical to the other pairs but may also include a switch circuit or the like as long as the main structure is the same such that the characteristics of the output voltage are the same. Throughout herein, the word "similar" is to be understood in this sense.

With an IC thus formed, the pair of pads connected to the additional resistor is used to measure the resistance value of the additional resistor. In other words, one of the pair is used for forcing a current and the other for measuring the voltage in a probe test by means of the additional buffer amplifier such that an accurate resistance value can be obtained by avoiding the effects of variations in the contact resistance, etc. At the time of a sorting work, for example, this measured value is used as the resistance value of each of the terminal resistors and the work is resumed under this assumption. In the case of an IC, circuit elements such as resistors and amplifiers on the same IC with similar structures have much smaller variations in their functional values such as the resistance values than between those on different ICs. This assumption is highly trustworthy.

Thus, there is no need to measure the resistance values of many terminal resistors directly. Since one measurement suffices, the measurement of the terminal resistors becomes much simpler. Moreover, since no additional pad is required next to each of the bonding pads corresponding to the terminal resistors which do no longer have to be directly measured, the parasitic capacitance is reduced accordingly. In summary, according to the first approach of this invention, one can obtain ICs for an active terminator with small parasitic capacitance of which the terminal resistance values can be easily measured.

An IC for an active terminator according to a second of the aforementioned five approaches of the invention may be characterized not only as relating to the type of active terminator IC having a plurality of pairs each corresponding to a different line of a bus and including a buffer amplifier and a terminal resistor, each of the buffer amplifiers serving to output a specified voltage through the corresponding terminal resistor to the corresponding bus line, there already being additionally provided a "similar" voltage-monitoring buffer amplifier apart from any of the bus lines, but also as comprising an additional resistor with one end connected to this voltage-monitoring buffer amplifier and the other end connected to a pair of pads, the word "similar" being used in the sense explained above.

With an IC thus formed, the already existing voltage-monitoring buffer amplifier is utilized for receiving the forced current to measure the resistance value of the additional resistor. Thus, there is no need to install a new buffer amplifier as required according to the first embodiment of the invention described above. In other words, the circuit does not have to be redesigned and the scale of the circuit does not have to be increased since the already existing buffer amplifier can be utilized for this additional function.

An IC for an active terminator according to a third of the aforementioned five approaches of the invention may be characterized not only as relating to the type of active terminator IC having a plurality of pairs each corresponding to a different line of a bus and including a buffer amplifier and a terminal resistor, each of the buffer amplifiers serving to output a specified voltage through the corresponding terminal resistor to the corresponding bus line, but also wherein each of the terminal resistors is connected to adjustment resistors, each of these adjustment resistors is connected to an additional buffer amplifier which serves to output a specified voltage to the corresponding line through the corresponding adjustment resistor, these buffer amplifiers can be switched on or off by a control signal received through a control line, and some of the control lines are connected into one common line containing a repair part at which it can be cut. An IC thus formed can be adjusted through its repair parts such that the combined resistance value due to a main resistor and any of the adjustment resistors for each line of the bus will come within an allowance range. In other words, if the resistance value of the main resistor is too large, one or more adjustment resistors are connected such that the value of the connected resistors will fall within the allowable range, and if the resistance value of the main resistor is too small, one or more adjustment resistors which are connected may be cut off. After the resistance value of the terminal resistor corresponding to one of the lines of the bus is completed, it is not that similar procedures are repeated with the terminal resistors corresponding to the other lines but the adjustments are carried out only indirectly by controlling the additional buffer amplifiers on the basis of the control signals. Since repair parts are provided on common lines each connected to control lines for the individual lines, adjustments of terminal resistance values can be carried out all at once on all of the lines of the bus. This is a practical manner of adjustments because, as described above, buffer amplifiers and other circuit elements structured similarly or identically and installed in the same IC have usually small variations in their functional values. In summary, adjustments can be carried out easily with a smaller number of steps.

An IC for an active terminator according to a fourth of the aforementioned five approaches of the invention may be characterized as being similar to the one according to the first and second approaches of this invention and wherein adjustment resistors, each connected to a corresponding one of additional buffer amplifiers, are connected to each of the terminal and additional resistors, each of these additional amplifiers serves to output a specified voltage to the corresponding line through the corresponding adjustment resistor, these buffer amplifiers can be switched on or off by a control signal received through a control line, and some of the control lines are connected into one common line containing a repair part at which it can be cut. An IC thus structured enjoys the advantages of not only the first and second approaches but also the third approach of this invention. In other words, dummy pads are not required for each bonding pad and a measurement of the terminal resistance can be carried out by making an adjustment on only one of the lines.

An IC for an active terminator according to the fifth of the aforementioned five approaches of the invention may be characterized as being similar to the one according to the third and fourth approaches of this invention and wherein the terminal and adjustment resistors include a pair of resistors with positive and negative temperature characteristics. With an IC thus structured, the resistance value of the terminal resistor is measured at a high-temperature condition and a lowtemperature condition and adjustments are done such that their temperature characteristics can cancel each other. Thus, the resistance value of the terminal resistor can be reliably kept within its allowable range although the ambient temperature may undergo significant changes. In other words, the present invention makes it possible to operate a bus under a stable condition even where severe temperature changes do occur.

BRIEF DESCRIPTION OF THE DRAWINGS

The accompanying drawings, which are incorporated in and form a part of this specification, illustrate embodiments of the invention and, together with the description, serve to explain the principles of the invention. In the drawings:

FIG. 1 is a circuit diagram of an IC for an active terminator according to a first embodiment of this invention;

FIG. 2 is a circuit diagram of an example of terminal resistor;

FIG. 3 is a circuit diagram of an IC for an active terminator according to a second embodiment of this invention;

FIG. 4 is a circuit diagram of an IC for an active terminator according to a third embodiment of this invention;

FIG. 5 is a circuit diagram of a basic active terminator which was considered and attempted earlier;

FIG. 6 is a circuit diagram of another active terminator which was considered and attempted earlier for driving an amplifier;

FIG. 7 is a drawing for showing a method of adjusting the resistance value of an IC;

FIG. 8 is a drawing for showing a method of measuring the resistance value of an IC; and FIG. 9 is a circuit diagram of an active terminator which was considered and attempted earlier allowing measurement of its resistance value.

Throughout herein, like components are sometimes indicated by the same symbols and are not repetitiously explained.

DETAILED DESCRIPTION OF THE INVENTION

The invention will be described next by way of some embodiments. FIG. 1 shows a first embodiment taking the first two of the approaches described above, FIG. 3 shows a second embodiment taking the third approach and FIG. 4 shows a third embodiment taking the fourth approach. FIG. 2 shows an example of a terminal resistor embodying the fifth approach according to this invention.

FIG. 1 shows an active terminator IC 100 according to a first embodiment of this invention which is similar to the IC 12 shown in FIG. 9 but is different therefrom wherein the dummy pads 31a–3na are removed from FIG. 9 and replaced by an additional resistor R0 and dummy pads 130 and 130a. The additional resistor R0 is of the same structure as the terminal resistors R and has one of its ends connected to the output line of the voltage-monitoring buffer amplifier 20 and the other end connected to dummy pad 130. The two (newly introduced) dummy pads 130 and 130a are set near each other to form a pair and they are connected by a connecting line.

In short, this IC 100 includes a series-connected pair of buffer amplifier 20 and additional resistor R0 which is like any of the other series-connected pairs of a terminal resistors R and a corresponding one of the buffer amplifiers 21–2n but is not corresponding to any of the bus lines BUS1–BUSn, being independent thereof. In addition, there is a pair of pads 130 and 130a connected to the end of the additional resistor R0 opposite and not connected to the buffer amplifier 20.

When this IC 100 is used in a normal manner as an active terminator, the voltage on each of the bus lines BUS1–BUSn is suddenly changed in response to changes in the signal driving conditions of the drive units (not shown) connected to the bus lines. Correspondingly, the buffer amplifiers 21–2n repeat charging and discharging through the terminal resistors R but since there are no dummy pads 31a–3na next to the bonding pads 31–3n, the charging and discharging can be carried out accordingly faster. In other words, the voltage conditions of the bus lines BUS1–BUSn can stabilize faster, allowing high-speed operations.

Next will be described the measurement of a terminal resistance value by a probe test. In this case, it is not the individual terminal resistors R but only the additional resistor R0 that is measured directly.

The measurement of resistance value of the additional resistor R0 is carried out by forcing a constant current I to flow through a probe pin to the dummy pad 130. In this case, the constant current I flows from the dummy pad 130 through the additional resistor R0 to the buffer amplifier 20. While this constant current I is maintained, the voltage V1 of the bonding pad 30 is detected by the probe pin and the voltage V2 of the dummy pad 130a is detected by another probe pin. From these measured voltage values, a measured resistance value R0 can be obtained by R0=(V2−V1)/I without involving the effects of contact resistance.

If the resistance value of the additional resistor R0 thus obtained is within the allowed range for the terminal resistors R, it is decided that the resistance values of all terminal resistors R are also within this allowed range and hence that this IC is an acceptable product. If the measured value of the additional resistor R0 is not within this allowed range, on the other hand, it is decided that each of the terminal resistors R is outside the allowed range and hence that this IC is a defective product. In summary, the sorting work can be accomplished more quickly.

Although the bonding pad 30 was used in this example for measuring the voltage V1, it is possible to obtain a measured value corresponding to V1 without using this bonding pad 30. According to this method, the voltage of the dummy pad 130 or 130a is preliminarily measured by using an instrument with an infinitely large input resistance such as FET-type instrument while no forced current such as the constant current I is being passed through the additional resistor R0 and this measured voltage is used as V1 in the equation above. The difference between the voltage thus obtained and the actual value of voltage V1 is extremely small unless the forced current when measuring the voltage V2 exceeds the driving capability of the buffer amplifier 20. It may be ignored in practical applications.

According to another method of measuring the resistance value of the additional resistor R0 without using the bonding pad 30, another constant current I3 not exceeding the driving capability of the buffer amplifier 20 is forced on the dummy pad 130 and the voltage V3 at the dummy pad 130 is measured as the voltage V2 of the dummy pad 130 was measured by forcing a constant current I on the dummy pad 130. In this case, the resistance value may be calculated by the formula R0=(V3−V2)/(I3−I2).

FIG. 3 shows an active terminator IC 200 according to a second embodiment of the invention which is similar to the earlier considered IC 11 shown in FIG. 6 above with the repair parts 91, 92, . . . for the terminal resistors R shown in FIG. 7 removed and replaced by new buffer amplifiers 21a, 21b,—2na and 2nb as well as a new repair part 900. The newly introduced buffer amplifiers 21a and 21b are structured similarly to the buffer amplifier 21, receiving the pull-up voltage $V_{up}$ as the input to carry out current amplification and serving to switch the output condition between the output of the pull-up voltage $V_{up}$ as a specified voltage and a floating condition with high impedance. The other buffer amplifiers 22a, 22b,—2na and 2nb are structured and function similarly.

The terminal resistor R corresponding to the bus line BUS1 includes a main resistor 281 with resistance value 101Ω and two adjustment resistors 281a and 281b with resistance value 10 KΩ, as described above with reference to FIG. 7, but these resistors are directly connected to the bonding pad 31 without having any repair part (of the kind shown at 91 in FIG. 7). The other end of the main resistor 281 is connected to the output line of the buffer amplifier 21, the other end of the adjustment resistor 281a is connected to the output line of the buffer amplified 21a and the other end of the adjustment resistor 281b is connected to the output line of the buffer amplifier 2lb. The other terminal resistors R corresponding to the other bus lines BUS2–BUSn are all similarly structured and connected.

In summary, the main resistor 281–28n of each of the terminal resistors R is accompanied by two adjustment resistors 281a, 281b, 28na and 28nb, corresponding to which buffer amplifiers 21a, 21b,— 2na and 2nb are provided such that these buffer amplifiers each serve to connect the corresponding line of the bus through the corresponding one of the terminal resistors R to the specified voltage $V_{up}$.

With the IC 200, furthermore, the plurality of lines for the control signal CTRL to the buffer amplifiers 21, 22,—2n are joined and connected together to the bonding pad 38. Similarly, those to the buffer amplifiers 21a, 22a,—2na are joined and connected together to the bonding pad 38, and those to the buffer amplifiers 21b, 22b–2nb are joined and connected together to the bonding pad 38. A laser-cutting point 901 is provided on the line connected in common for the control signal CTRL to the buffer amplifiers 21a–2na, and another laser-cutting point 902 is similarly provided on the line connected in common for the control signal CTRL to the buffer amplifiers 21b–2nb. The repair part 900 containing these two laser-cutting points is placed where the repair work can be performed easily.

The method of operating the IC 200 is approximately the same as that for an earlier considered IC. Only the work for adjusting the resistance value of a terminal resistor R will be described next.

In order to adjust the resistance values of the terminal resistors R, the resistance value of one of the terminal resistors R, such as the one connected to the bonding pad 31, is preliminarily measured. If this measured value is the same as the desired resistance value, say 100Ω, the IC is left as is. If the measured resistance value is 99Ω, either of the laser-cutting points 901 and 902 is cut. If the measured value is 98Ω, both laser-cutting points 901 and 902 are cut. After the active terminator IC 200 thus adjusted is connected to a bus line and receives a control signal CTRL, the pull-up voltage $V_{up}$ is supplied to this bus line through the corresponding resistor from the buffer amplifier corresponding to the line for the control signal CTRL which has not been cut. In the meantime, the buffer amplifiers corresponding to a line for the control signal CTRL remain in a floating output condition and the corresponding terminal resistors do not contribute to the ends of the corresponding bus lines. Each line of the bus is thus connected with an optimal resistance value.

FIG. 4 shows still another active terminator IC 300 according to a third embodiment of the invention, which combines the features of the ICs 100 and 200 according to the first and second embodiments, having the dummy pads 31a–3na and the repair parts 91 and 92 of the prior example removed and an additional resistor R0, dummy pads 130 and 130a, buffer amplifiers 21a, 21b–2na and 2nb and a repair part 900 introduced.

FIG. 2 shows a terminal resistor which may be used in any of the above three embodiments of this invention, including a main resistor and a pair of adjustment resistors, one having positive and the other having negative temperature characteristic. In FIG. 2, symbols "+" and "−" respectively indicate a resistor with positive or negative temperature characteristic and the main resistor of 101Ω is formed by a parallel connection of two resistors 283 and 284 each of 202Ω respectively with positive and negative temperature characteristic, such that the overall temperature characteristic is improved because their individual variations can cancel each other.

Adjustment resistors 285a and 285b with 20 kΩ and respectively positive and negative temperature characteristic are arranged as a pair, and there is another pair of such adjustment resistors 285c and 285d. These adjustment resistors are all connected to the bonding pad 31 directly and in common on one side, and individually to the buffer amplifiers 21a–21d on the other side.

When the resistance value of such a terminal resistor R thus structured is to be adjusted, its resistance value is first measured under a low-temperature condition (say, at 0° C.) and then under a high-temperature condition (say, at 70° C.).

If the measured values at these temperatures are both 100Ω (the desired value), the IC is left as is. If they are both 99Ω, the line for the control signal CTRL is repaired such that the pair of resistors 285a and 285b with positive and negative temperature characteristics or the other similar pair of resistors 285c and 285d will be cut. If the two measured resistance values are both 98Ω, the common connecting line for the control signal CTRL to the buffer amplifiers 21a–21d is cut for adjustment. If the measured value is 99Ω at 0° C. but is 100Ω at 70° C., the line of the buffer amplifier 21a or 21c for the control signal CTRL is repaired such that either of the resistors 285a and 285c with positive temperature characteristic is cut. Similarly, if the measured value is 100Ω at 0° C. but is 99Ω at 70° C., the line of the buffer amplifier 21b or 21d for the control signal CTRL is repaired such that either of the resistors 285b or 285d with negative temperature characteristic is cut.

Thus, adjustment resistors 285a–285d with positive and negative temperature characteristics are appropriately selected and an adjustment is carried out on the common connecting line to the corresponding buffer amplifiers such that the terminal resistance value can be accurately adjusted and a stable temperature characteristic can be obtained.

The disclosure above is not intended to limit the scope of the invention. Many modifications and variations are possible within the scope of the invention. For example, the repair works may be effected by connecting initially separated lines by means of a focused ion beam or the like instead of a laser-cutting method. It also goes without saying that both such methods may be used.

The bonding pads of packaged ICs are usually connected to an external bus line or the like by means of an IC pin.

In summary, an IC according to the first approach of this invention for an active terminator does not require direct measurements on many terminal resistors and there is no need to set an additional pad next to the bonding pad for connecting to a bus line. Thus, an IC with only small parasitic capacitance is obtained, of which the terminal resistance can be easily measured. An IC according to the second approach of the invention is easier to design without increasing the scale of the circuit because the resistance values can be measured by using the already existing buffer amplifier for monitoring. With an IC according to the third approach of the invention, the terminal resistors are still more easily adjusted because as soon as terminal resistors for one of the bus lines are adjusted, those of the other lines are automatically deemed adjusted. If the fourth approach of the invention is incorporated, the measurement and adjustment of the terminal resistance become still easier because no dummy pad is required for each bonding pad and an IC with small parasitic capacitance can be obtained. An IC according to the fifth approach of the invention can be operated at a fast speed even in a severe environment where temperature changes rapidly because temperature adjustment can be made at the same time as the adjustment of the terminal resistance values.

What is claimed is:

1. An IC for an active terminator for a bus, said IC comprising:

a plurality of pairs each of a buffer amplifier and a terminal resistor, each of said pair corresponding to a different line of said bus, said buffer amplifier serving to output a specified voltage through said terminal resistor and a bonding pad to said corresponding line, said bonding pad not being connected directly to any other similarly structured bonding pad;

a similar pair, not corresponding to any of the lines of said bus, of an additional buffer amplifier and an additional resistor, a pair of pads, one end of said additional resistor being connected to said additional buffer amplifier and the other end of said additional resistor being connected to said pair of pads;

adjustment resistors each connected to a different one of the terminal resistors and the additional resistors;

adjustment buffer amplifiers each connected to a different one of said adjustment resistors and serving to output a specified voltage through a corresponding one of said adjustment resistors to a corresponding line of said bus;

control lines connected to said adjustment buffer amplifiers to transmit control signals for controlling output conditions of said adjustment buffer amplifiers, said control lines being grouped together into common lines;

repair parts provided in said common lines for connecting or disconnecting said common lines.

2. The IC of claim 1 wherein said bonding pad is inserted between said terminal resistor and said one corresponding line.

3. An IC for an active terminator for a bus, said IC comprising:

a plurality of pairs each of a buffer amplifier and a terminal resistor, each of said pair corresponding to a different line of said bus, said buffer amplifier serving to output a specified voltage through said terminal resistor to said corresponding line;

a similar pair, not corresponding to any of the lines of said bus, of an additional buffer amplifier and an additional resistor;

a pair of pads, one end of said additional resistor being connected to said additional buffer amplifier and the other end of said additional resistor being connected to said pair of pads;

adjustment resistors each connected to a different one of the terminal resistors and the additional resistor;

adjustment buffer amplifiers each connected to a different one of said adjustment resistors and serving to output a specified voltage through a corresponding one of said adjustment resistors to a corresponding line of said bus;

control lines connected to said adjustment buffer amplifiers to transmit control signals for controlling output conditions of said adjustment buffer amplifiers, said control lines being grouped together into common lines; and repair parts provided in said common lines for connecting or disconnecting said common lines; wherein said terminal resistors or said adjustment resistors include a pair of resistors having positive and negative temperature characteristics.

4. An IC for an active terminator for a bus, said IC comprising:

a plurality of pairs each of a buffer amplifier and a terminal resistor, each of said pair corresponding to a different line of said bus, said buffer amplifier serving to output a specified voltage through said terminal resistor and a bonding pad to said one corresponding line, said bonding pad not being connected directly to any other similarly structured bonding pad;

adjustment resistors each connected to one of said terminal resistors;

adjustment buffer amplifiers each being connected to a different one of said adjustment resistors and serving to output a specified voltage through a corresponding one of said adjustment resistors to a corresponding line of said bus;

control lines each connected to a different one of said adjustment buffer amplifiers to transmit control signals for controlling output conditions of said adjustment buffer amplifiers;

combined lines each connected in common to a different group of said control lines; and repair parts each inserted to a different one of said combined lines for connecting or disconnecting selected one or ones of said combined lines.

5. The IC of claim 4 wherein said terminal resistors or said adjustment resistors include a pair of resistors having positive and negative temperature characteristics.

6. The IC of claim 4 wherein said bonding pad is inserted between said terminal resistor and said one corresponding line.

* * * * *